United States Patent
Berding

(10) Patent No.: US 6,603,620 B1
(45) Date of Patent: Aug. 5, 2003

(54) MOBILE DEVICE COMPRISING A DISK STORAGE SYSTEM PROTECTED BY A MOTION DETECTOR

(75) Inventor: Keith R. Berding, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 245 days.

(21) Appl. No.: 09/866,203

(22) Filed: May 25, 2001

(51) Int. Cl.[7] ............................................. G11B 19/04
(52) U.S. Cl. ............................ 360/60; 360/75; 360/68
(58) Field of Search ............................ 360/60, 75, 69, 360/68, 67, 46, 31, 97.02

(56) References Cited

U.S. PATENT DOCUMENTS

| | | | |
|---|---|---|---|
| 5,062,087 A | | 10/1991 | Dydzyk |
| 5,654,840 A | | 8/1997 | Patton et al. |
| 5,757,271 A | * | 5/1998 | Andrews ................. 340/689 |
| 5,949,369 A | | 9/1999 | Bradley et al. |
| 5,982,573 A | | 11/1999 | Henze |
| 6,101,062 A | | 8/2000 | Jen et al. |
| 6,115,200 A | | 9/2000 | Allen et al. |

* cited by examiner

Primary Examiner—Alan T. Faber
(74) Attorney, Agent, or Firm—Milad G. Shara, Esq.; Howard H. Sheerin, Esq.

(57) ABSTRACT

A mobile device is disclosed comprising a disk storage system including a disk and a head actuated over the disk, wherein the disk comprises a data area. The mobile device further comprises a motion detector for detecting a relative velocity and distance of a foreign object with respect to the mobile device. When the motion detector detects an impending impact with the foreign object, retracting circuitry within the mobile device retracts the head away from the data area of the disk.

54 Claims, 7 Drawing Sheets

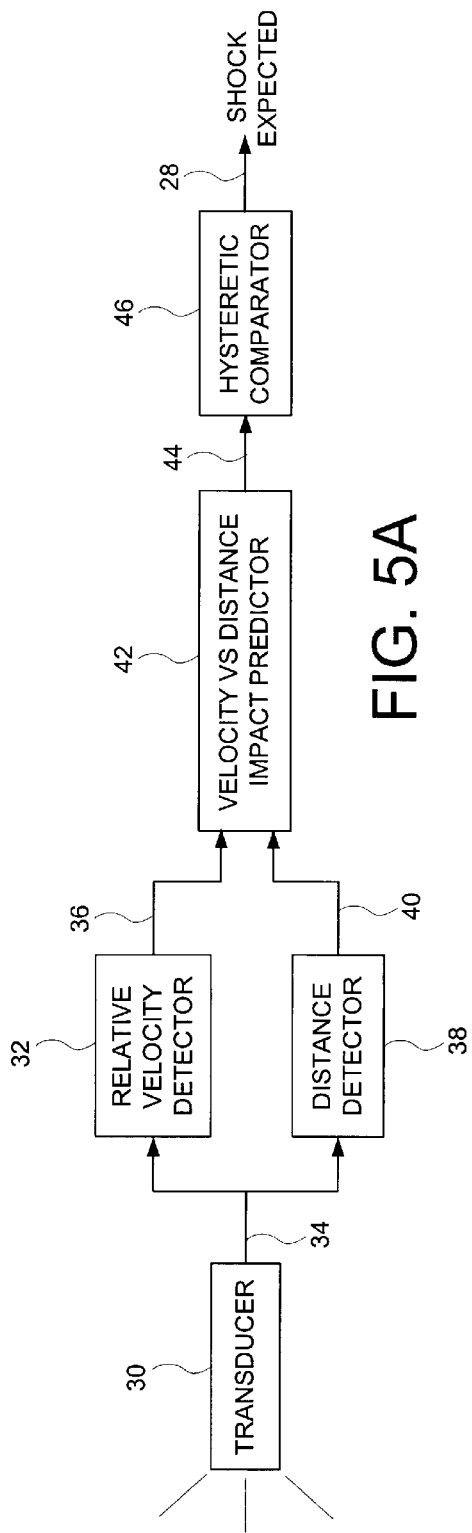
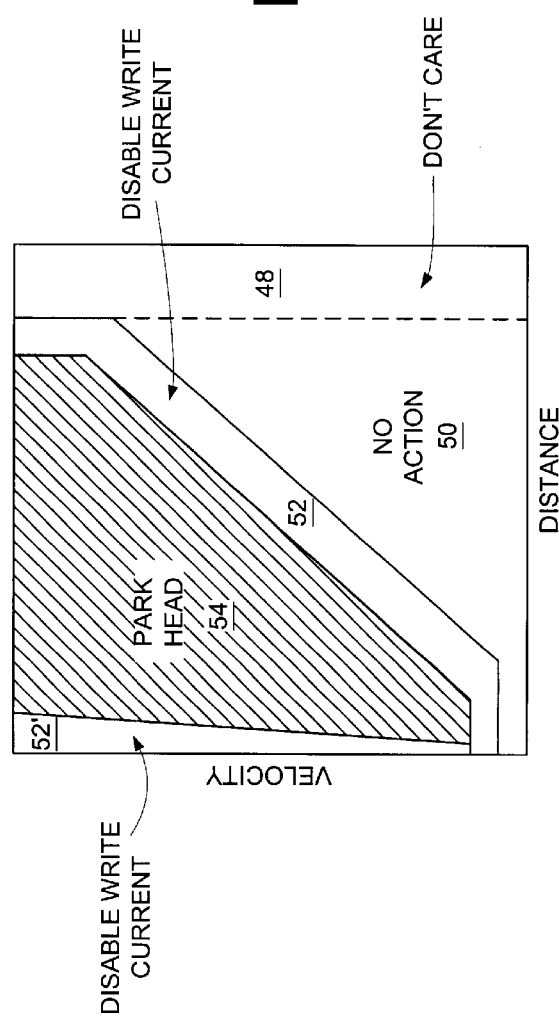

MOBILE DEVICE COMPRISING A DISK STORAGE SYSTEM PROTECTED BY A MOTION DETECTOR

BACKGROUND OF THE INVENTION

1. Field of the Invention

The present invention relates to mobile devices. More particularly, the present invention relates to a mobile device comprising a disk storage system protected by a motion detector.

2. Description of the Prior Art

Integrating a disk storage system into a mobile device (e.g., a handheld computer such as a personal digital assistant (PDA), cellular phone, digital camera, tablet computer, etc.) provides a significant amount of non-volatile data storage for a relatively low cost. A disk storage system comprises a head flying just above the surface of a rotating disk. The head is attached to the distal end of an actuator arm which is rotated about a pivot by a voice coil motor in order to actuate the head over the disk. The disk comprises a magnetic coating which is magnetized by an inductive element in the head in order to write magnetic transitions onto the surface of the disk representing the recorded data. During a read operation, a read element in the head (e.g., inductive or magnetoresistive) detects the magnetic transitions to generate a read signal that is demodulated into an estimated data sequence representing the recorded digital data. Physical shocks can cause the head and actuator arm assembly to deviate off track and over-write data in adjacent tracks before the servo system detects the error. In addition, the head and the media can be damaged if the head "slaps" onto the surface of the disk. Physical shocks due to impacts with the ground or other hard objects (hereinafter foreign objects) are of particular concern for mobile devices due to their potentially abusive operating environment.

There is, therefore, a need for a mobile device capable of detecting an impending impact with a foreign object so that protective measures can be taken to prevent damage to the data, heads or media.

SUMMARY OF THE INVENTION

The present invention may be regarded as a mobile device comprising a disk storage system including a disk and a head actuated over the disk, wherein the disk comprises a data area. The mobile device further comprises a motion detector for detecting a relative velocity and distance of a foreign object with respect to the mobile device. When the motion detector detects an impending impact with the foreign object, retracting circuitry within the mobile device retracts the head away from the data area of the disk.

In one embodiment the motion detector comprises at least one transducer. In one embodiment the at least one transducer rotates to perform an omni-directional scan around the mobile device. In an alternative embodiment, the motion detector comprises a plurality of transducers. In one embodiment, the plurality of transducers are arranged to form a substantially concentric scan from a predetermine point on the mobile device. In yet another embodiment, each transducer is activated in a predetermined sequence to perform an omni-directional scan around the mobile device. In still another embodiment, the plurality of transducers are distributed at predetermined locations about the mobile device.

In one embodiment, the transducer comprises a sonar transducer. In one embodiment, the sonar transducer operates in an ultrasonic range. In an alternative embodiment, the transducer comprises a radar transducer, and in yet another embodiment the transducer comprises an optical transducer.

In one embodiment, the transducer comprises wireless communication circuitry for implementing a wireless communication function for the mobile device.

In one embodiment, the mobile device further comprises impact-detect circuitry for detecting an effect of the impact with the foreign object, wherein operation of the motion detector is adapted in response to detecting the effect of the impact with the foreign object.

The present invention may also be regarded as a mobile device comprising a disk storage system including a disk, a head actuated over the disk, and a preamp for applying a write current to the head during a write operation. The mobile device further comprises a motion detector for detecting a relative velocity and distance of a foreign object with respect to the mobile device. When the motion detector detects an impending impact with the foreign object, the write current is disabled.

The present invention may also be regarded as a method of operating a mobile device comprising a disk storage system including a disk and a head actuated over the disk, the disk comprising a data area. The method comprises the steps of detecting a relative velocity and distance of a foreign object with respect to the mobile device, and retracting the head away from the data area of the disk when an impending impact with the foreign object is detected.

The present invention may also be regarded as a method of operating a mobile device comprising a disk storage system including a disk and a head actuated over the disk, wherein a write current is applied to the head during a write operation. The method comprises the steps of detecting a relative velocity and distance of a foreign object with respect to the mobile device, and disabling the write current when an impending impact with the foreign object is detected.

BRIEF DESCRIPTION OF THE DRAWINGS

FIG. 5A shows details of a motion detector according to an embodiment of the present invention as comprising a velocity detector for detecting a relative velocity between the mobile device and a foreign object, and a distance detector for detecting a distance between the mobile device and the foreign object.

FIG. 5B is a graph illustrating the operation of the motion detector of FIG. 5A wherein the write current applied to the head is disabled at a predetermined velocity for varying distances between the mobile device and a foreign object, and the head is retracted when the velocity exceeds a threshold for varying distances between the mobile device and the foreign object.

DESCRIPTION OF THE PREFERRED EMBODIMENTS

Figure 1:
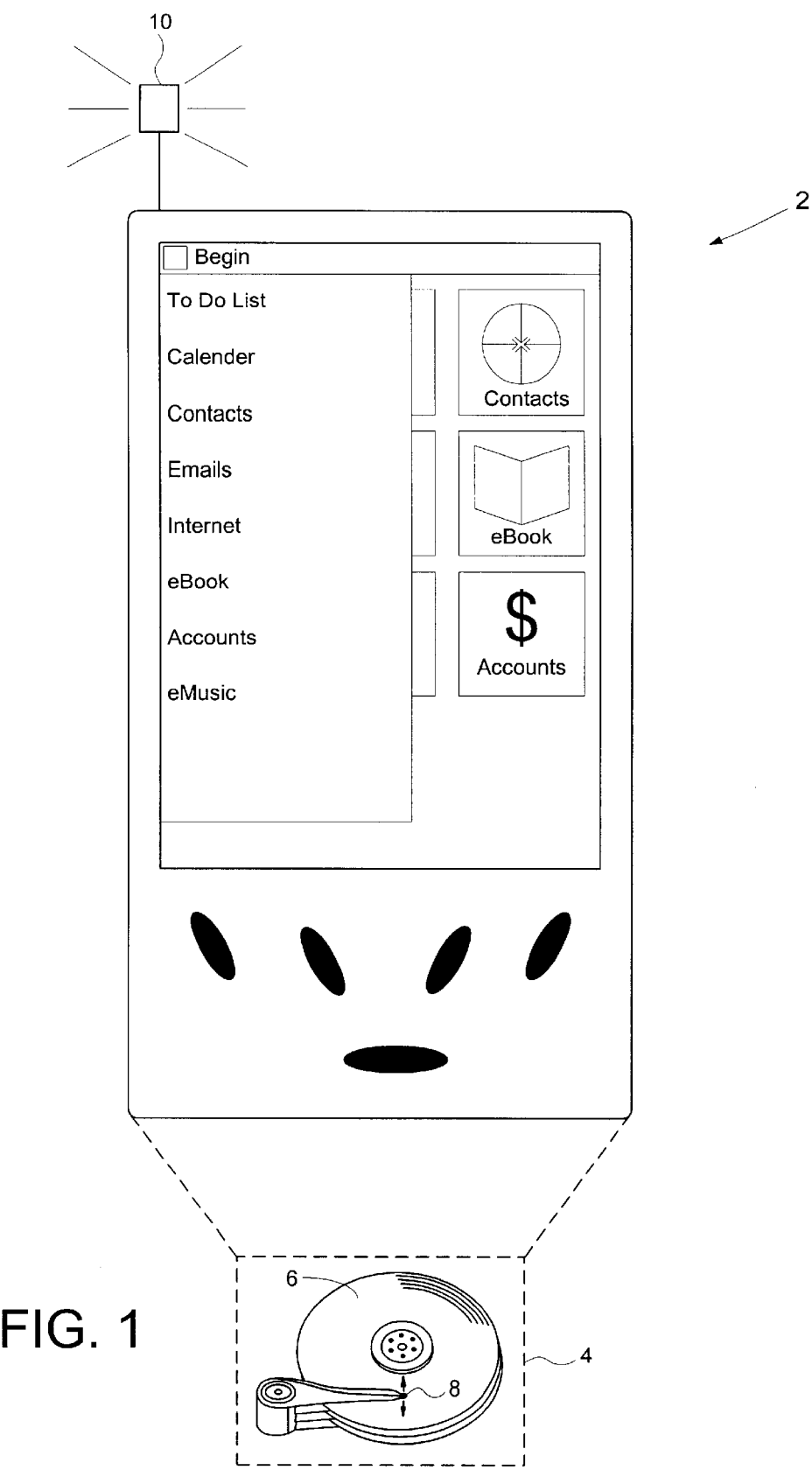
FIG. 1 shows a mobile device according to an embodiment of the present invention comprising a disk storage system and a motion detector mounted at the end of an antenna for protecting the head when an impending impact with a foreign object is detected.

FIG. 1 shows a mobile device 2 according to an embodiment of the present invention as comprising a disk storage system 4 including a disk 6 and a head 8 actuated over the disk 6, wherein the disk comprises a data area. The mobile device 2 further comprises a motion detector 10 for detecting a relative velocity and distance of a foreign object with respect to the mobile device 2. When the motion detector 10 detects an impending impact with the foreign object, retracting circuitry within the mobile device 2 retracts the head 8 away from the data area of the disk 6.

Any suitable motion detector 10 may be employed, including sonar, radar, and optical. In one embodiment the motion detector 10 comprises a transducer for sensing a signal reflecting off of the foreign object. A sonar detector, for example, emits a sonic ping at a specific frequency that reflects off of the foreign object. The transducer converts the reflected sound waves into an electrical signal that can be analyzed to determine the relative velocity and distance between the mobile device 2 and the foreign object. The distance between the mobile device 2 and the foreign object can be determined by measuring the time for the sonic ping to reach e foreign object and reflect back to the transducer. The relative velocity between the mobile device 2 and the foreign object can be determined by evaluating the distance at a predetermined interval, or by measuring the change in frequency of the reflected sound waves due to the Doppler effect. Radar detectors operate similar to sonar detectors, except that radio waves are the radiated signal. An optical sensor may be implemented, for example, using a charge coupled device (CCD) together with an image processing facility to evaluate the images output by the CCD. The relative distance and velocity may be determined by evaluating the size and change in size of objects detected by the CCD.

In one embodiment, the transmitter for transmitting the sensing signal (e.g., sonic ping or radio wave) is implemented separate from the transducer (receiver) that detects the reflected sensing signal. In an alternative embodiment, the motion detector's transmitter and the receiver are integrated into a single component as a transceiver. A suitable transceiver that may be employed in an embodiment of the present invention is the 40KPT18 sonar transceiver from Polaroid Corporation in Cambridge, Massachusetts.

In one embodiment, the mobile device comprises wireless communication circuitry (e.g., a cellular phone) which is advantageously used to transmit the sensing signal for the motion detectors transducer. In another embodiment, the wireless communication circuitry is advantageously used as the motion detector's receiver for sensing the reflected sensing signal.

Figure 2:
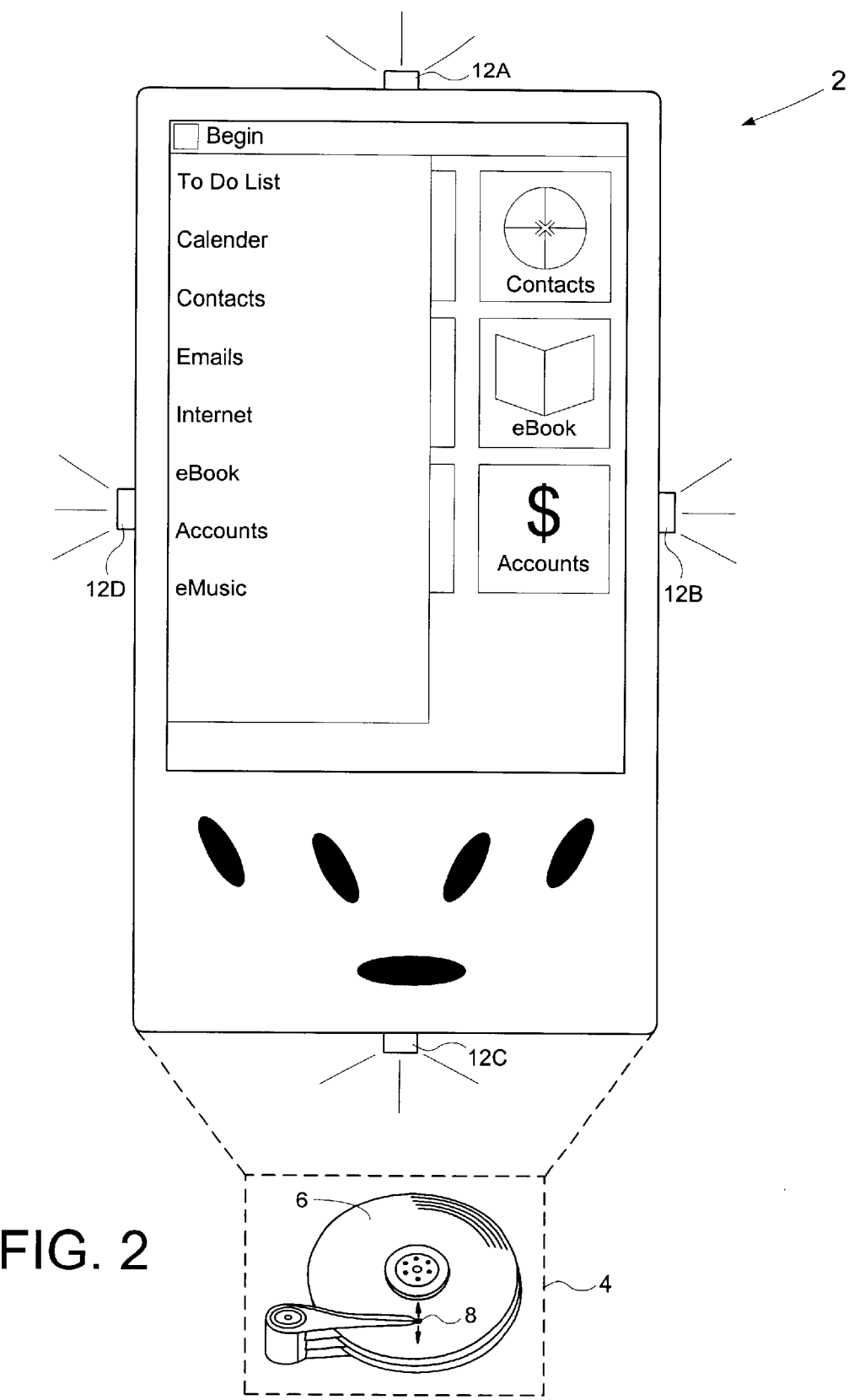
FIG. 2 shows a mobile device according to an embodiment of the present invention comprising a plurality of motion detectors distributed at predetermined locations about the mobile device.
Figure 3:
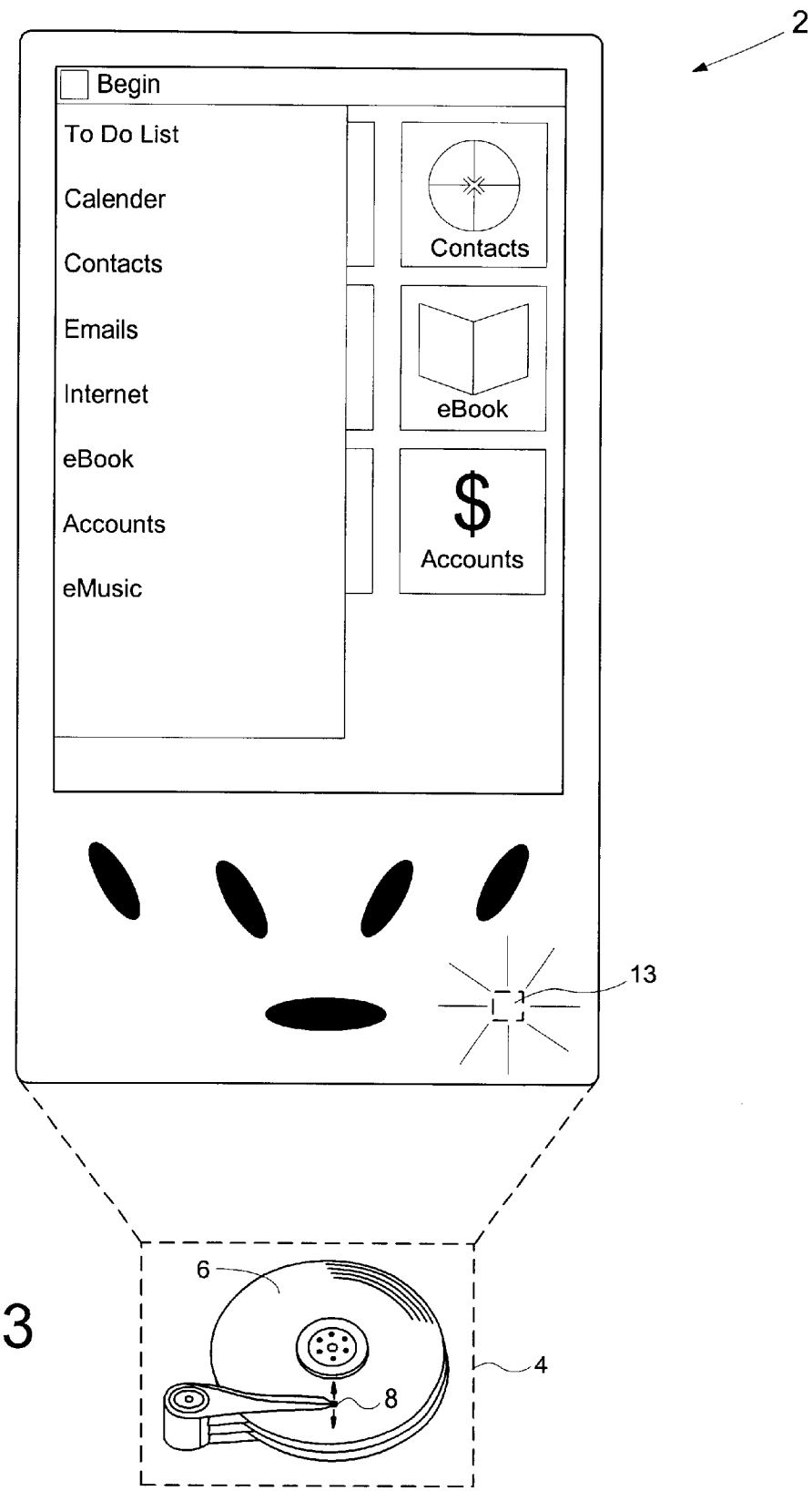
FIG. 3 is a mobile device according to an embodiment of the present invention comprising a motion detector enclosed within the mobile device.

In one embodiment, the transducer rotates to perform an omni-directional scan around the mobile device 2. In an alternative embodiment, the motion detector comprises a plurality of transducers arranged to form a substantially concentric scan from a predetermine point on the mobile device. Referring again to FIG. 1, the motion detector 10 may comprise a plurality of transducers arranged in a concentric circle about the end of an antenna. In one embodiment, each of the plurality of transducers is activated in a predetermined sequence (e.g., in series) to perform an omni-directional scan around the mobile device while attenuating interference between the transducers. FIG. 2 shows an alternative embodiment wherein a plurality of transducers 12A–12D are distributed at predetermined locations about the mobile device 2. FIG. 3 shows yet another embodiment wherein at least one transducer 13 is enclosed within the mobile device 2 and the sensor signal (e.g., sonic ping, radio wave, etc.) radiates through the enclosure of the mobile device 2.

Figure 4:
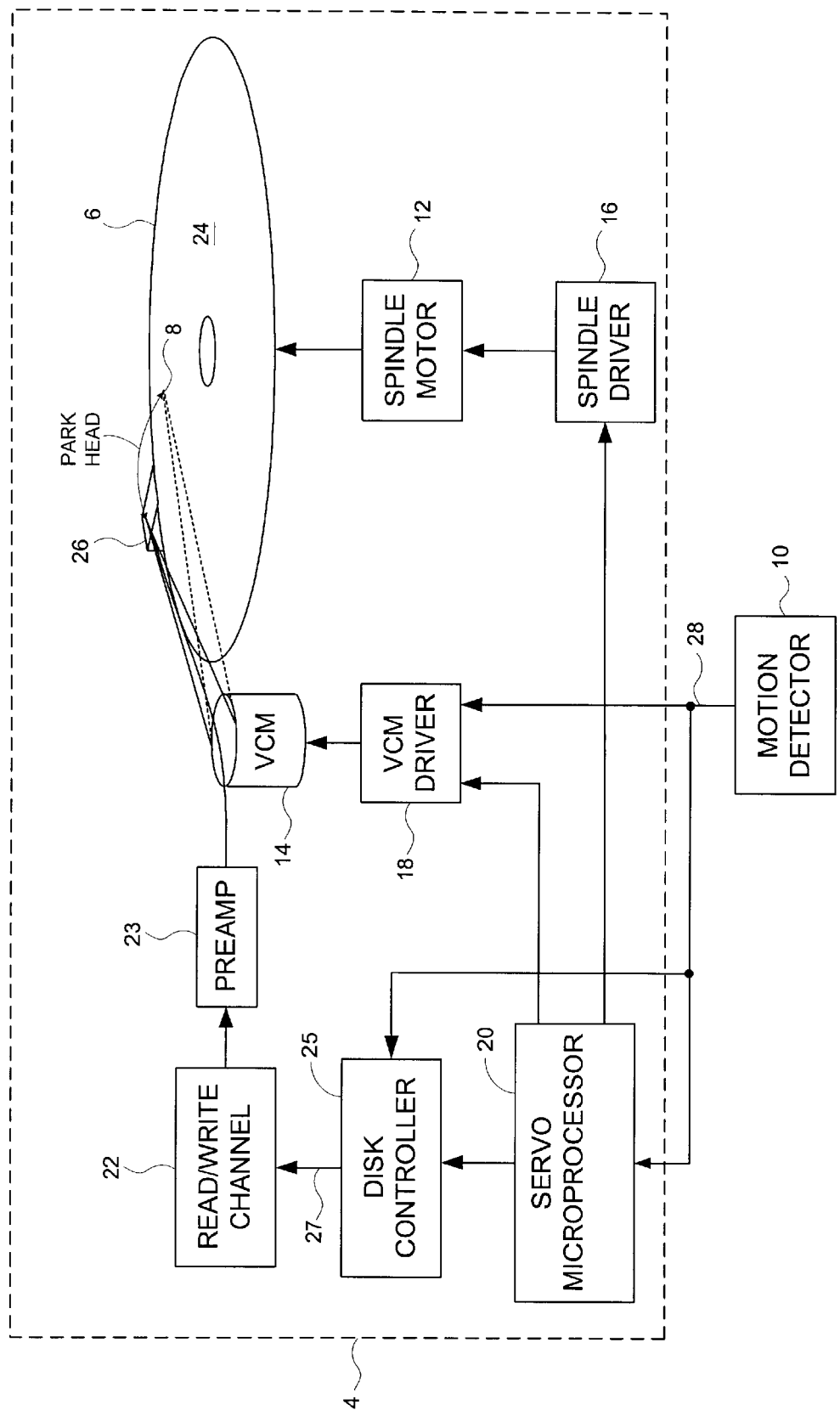
FIG. 4 shows details of the disk storage system and motion detector employed in a mobile device according to an embodiment of the present invention, the disk storage system comprising a read/write channel for disabling a write current applied to the head and VCM driver circuitry for retracting the head when a motion detector detects an impending impact with a foreign object.

FIG. 4 shows further details of a suitable disk storage system 4 and motion detector 10 for use in the mobile device 2 of FIG. 1. The disk 6 is rotated by a spindle motor 12 and the head 8 is actuated over the disk 6 by a voice coil motor (VCM) 14. Spindle driver circuitry 16 controls the spindle motor 12, and VCM driver circuitry 18 controls the VCM 14. A servo microprocessor 20 generates control signals applied to the spindle motor driver 16 and VCM driver 18. A read/write channel 22 provides write data to a preamp 23 which generates a write current applied to the head 8 during write operations, and processes a read signal generated by the head 8 and amplified by the preamp 23 during read operations. A disk controller 25 generates a write gate signal 27 applied to the preamp 23 through the read channel 22 to enable the write current at the appropriate time with respect to the data sectors recorded on the disk 6. During normal operation the servo microprocessor 20 generates control signals to actuate the head 8 over the data area 24 of the disk 6. In the embodiment of FIG. 4, the disk storage system 4 comprises a ramp 26 at the periphery of the disk 6 for parking the head 8 when the mobile device is powered down. In an alternative embodiment, the disk 6 comprises a landing zone (e.g., at the inner diameter of the disk) where the head 8 is parked.

The motion detector 10 generates a shock expected signal 28 applied to the servo microprocessor 20 which generates the appropriate control signals for the disk controller 25 to disable the write current via the write gate signal 27 and for the VCM driver 18 to retract the head 8 away from the data area 24 of the disk 6. In an alternative embodiment, the shock expected signal 28 is applied directly to the disk controller 25 and VCM driver 18 in order to disable the write current and retract the head 6 independent of the servo microprocessor 20 which may malfunction. In yet another embodiment, the write current is disabled without retracting the head 8 to avoid the associated latency while still protecting against off-track write errors.

Any suitable technique may be employed to disable the write current. For example, in one embodiment the shock expected signal 28 is applied directly to the read/write channel 22 for disabling the write current. In another embodiment, the shock expected signal 28. disables the power supplied to the preamp 23.

In one embodiment, when a shock expected condition is detected, the head 8 is parked (e.g., on the ramp 26 of FIG. 4 or on a landing zone on the disk 6) and the disk 6 is spun down. In an alternative embodiment, the head 8 is retracted away from the data area 24 of the disk 6 without parking the head 8 or spinning down the disk 6. For example, the head 8 may be retracted radially away from the data area 24 to a predetermined "safe zone" which may be on or off the disk 6. In another embodiment, the head 8 is retracted vertically away from the data area 24 of the disk 6. In one embodiment, the disk 6, head 8, spindle motor 12, VCM 14, and preamp 23 are implemented within a head disk assembly (HDA), and the remaining circuitry (spindle driver 16, VCM driver 18, read/write channel 22, and servo microprocessor 20) are mounted on a printed circuit board (PCB) integrated as part of the disk storage system 4. In an alternative embodiment, the spindle driver 16, VCM driver 18, read/write channel 22 and servo microprocessor 20 are integrated with the circuitry on the PCB of the mobile device. In one embodiment the motion detector 10 is mounted on the PCB of the disk storage system 4, and in alternative embodiment, the motion detector 10 is mounted on the PCB of the mobile device.

FIG. 5A shows circuitry according to an embodiment of the present invention for detecting an impending impact between the mobile device 2 and a foreign object. A transducer 30 detects a sense signal (e.g., sound, radio waves, light waves, etc.) reflecting off of the foreign object. A relative velocity detector 32 processes an output 34 of the transducer 30 to generate a velocity signal 36 representing the relative velocity between the mobile device and the foreign object. A distance detector 38 processes the output 34 of the transducer 30 to generate a distance signal 40 representing the distance between the mobile device and the foreign object. A velocity vs distance impact predictor 42 generates an impact expected signal 44 which is compared to a predetermined threshold by a hysteretic comparator 46 to generate the shock expected signal 28. The hysteresis helps filter the impact expected signal 44 so that the head 8 remains retracted until the threat from the foreign object or the actual shock from the foreign object subsides.

The operation of the velocity vs distance impact sensor 42 and hysteretic comparator 46 is understood with reference to the graph shown in FIG. 5B. Foreign objects having a relative distance greater than a predetermined threshold are not a threat to the mobile device, and therefore correspond to the "don't care" area 48 in the graph of FIG. 5B. When a foreign object comes within a predetermined range of the mobile device, its relative velocity is evaluated to determine whether there is a threat of impact. If the relative velocity of the foreign object is below a predetermined threshold for varying distances (represented by area 50 of FIG. 5B), the foreign object is not deemed a threat and no action is taken. When the relative velocity of the foreign object toward the mobile device exceeds a first predetermined threshold for varying distances (represented by area 52 of FIG. 5B), the write current is disabled. If the velocity does not exceed a second predetermined threshold (i.e., within area 52 of FIG. 5B), then the expected force of the impact is low. Therefore, the head 8 is not retracted to avoid the associated latency. If the velocity exceeds the second predetermined threshold (i.e., within area 54 of FIG. 5B), then the expected force of the impact is high and the head 8 is retracted to protect against "head slap". In one embodiment, if the relative velocity exceeds the second predetermined threshold but the distance between the mobile device and foreign object is below a threshold (i.e., within area 52' of FIG. 5B), then the write current is disabled without retracting the head 8 to avoid exacerbating the effect of the impact due to the impact perturbing the head 8 while moving.

Figure 6:
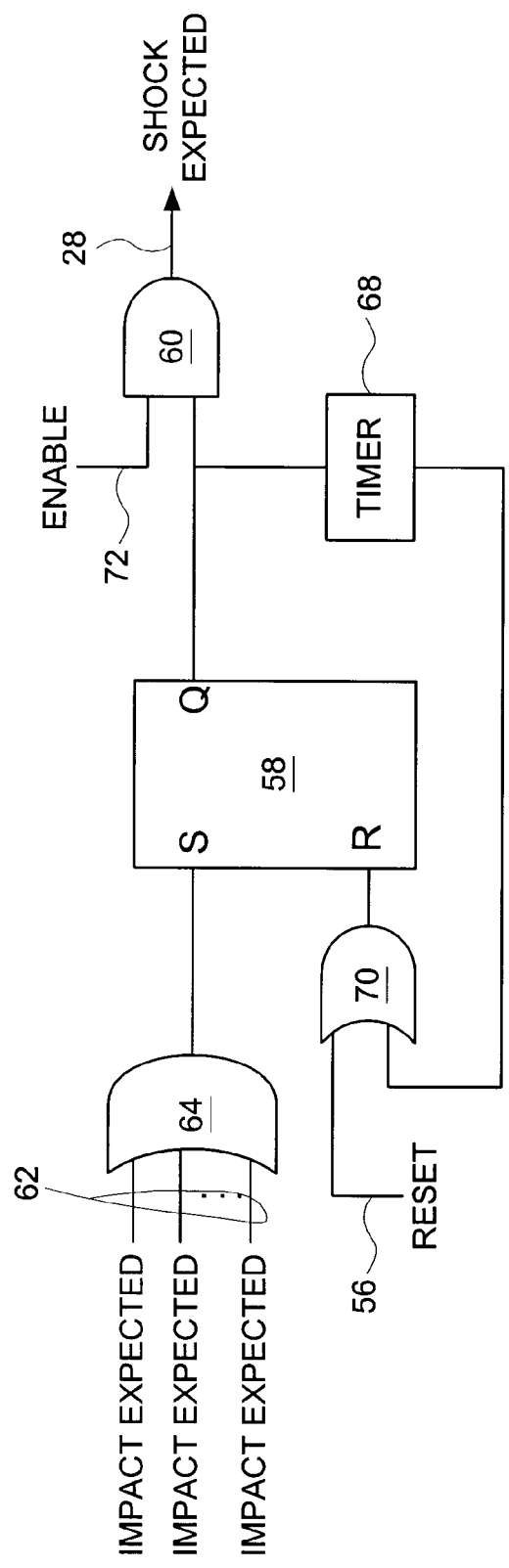
FIG. 6 shows circuitry according to an embodiment of the present invention for generating a shock expected signal used to disable the write current and retract the head, wherein the shock expected signal is reset after a predetermined interval.

FIG. 6 shows an alternative embodiment of the present invention which augments or replaces the hysteretic comparator 46 of FIG. 5A. This embodiment locks the head 8 in the retracted position for a predetermined interval, after which it is presumed the threat of impact with the foreign object or the actual shock from the impact will have subsided. When the mobile device is initialized, a reset signal 56 resets the circuitry of FIG. 6 in order to reset S/R flip-flop 58 and deactivate the shock expected signal 28 via AND gate 60. A plurality of motion detectors generate respective impact expected signals 62 (e.g., generated by the velocity vs distance impact predictor 42 or hysteretic comparator 46 of FIG. 5A) which are ored by OR circuit 64. When any one of the impact expected signals 62 is activated, the S/R flip-flop 58 is set in order to activate the shock expected signal 28 via AND gate 60 and start a timer 68. At the end of a predetermined interval, the timer 68 resets the shock expected signal 28 by resetting the S/R flip-flop 58 via OR gate 70. In one embodiment, the predetermined time interval is about 1 second.

In an alternative embodiment, in place of or in addition to the timer 68, the mobile device comprises circuitry for detecting the actual shock and for detecting when the effects from the shock have subsided to a safe level. In one embodiment the mobile device comprises an accelerometer capable of detecting an acceleration of the mobile device. The shock is considered subsided when the output of the accelerometer falls below a predetermined threshold. In another embodiment, the mobile device evaluates the current applied to the spindle motor, and the shock is considered subsided when the current applied to the spindle motor stabilizes.

In one embodiment, the circuitry for detecting the actual shock is used to adapt the operation of the motion detector 10. For example, the algorithm implemented by the velocity vs distance impact predictor 42 of FIG. 5A, as well as the first and second thresholds shown in the graph of FIG. 5B, may be fine tuned relative to the actual effect of the impact as compared to the predicted effect of the impact.

The circuitry of FIG. 6 further includes an enable signal 72 for disabling the shock expected signal 28. The shock expected signal 28 may be disabled, for example, if the motion detector 10 malfunctions in which case a warning message is displayed to the user while still allowing the user to operate the mobile device. The user may choose to backup the data currently stored on the mobile device and then repair or replace the mobile device.

Figure 7:
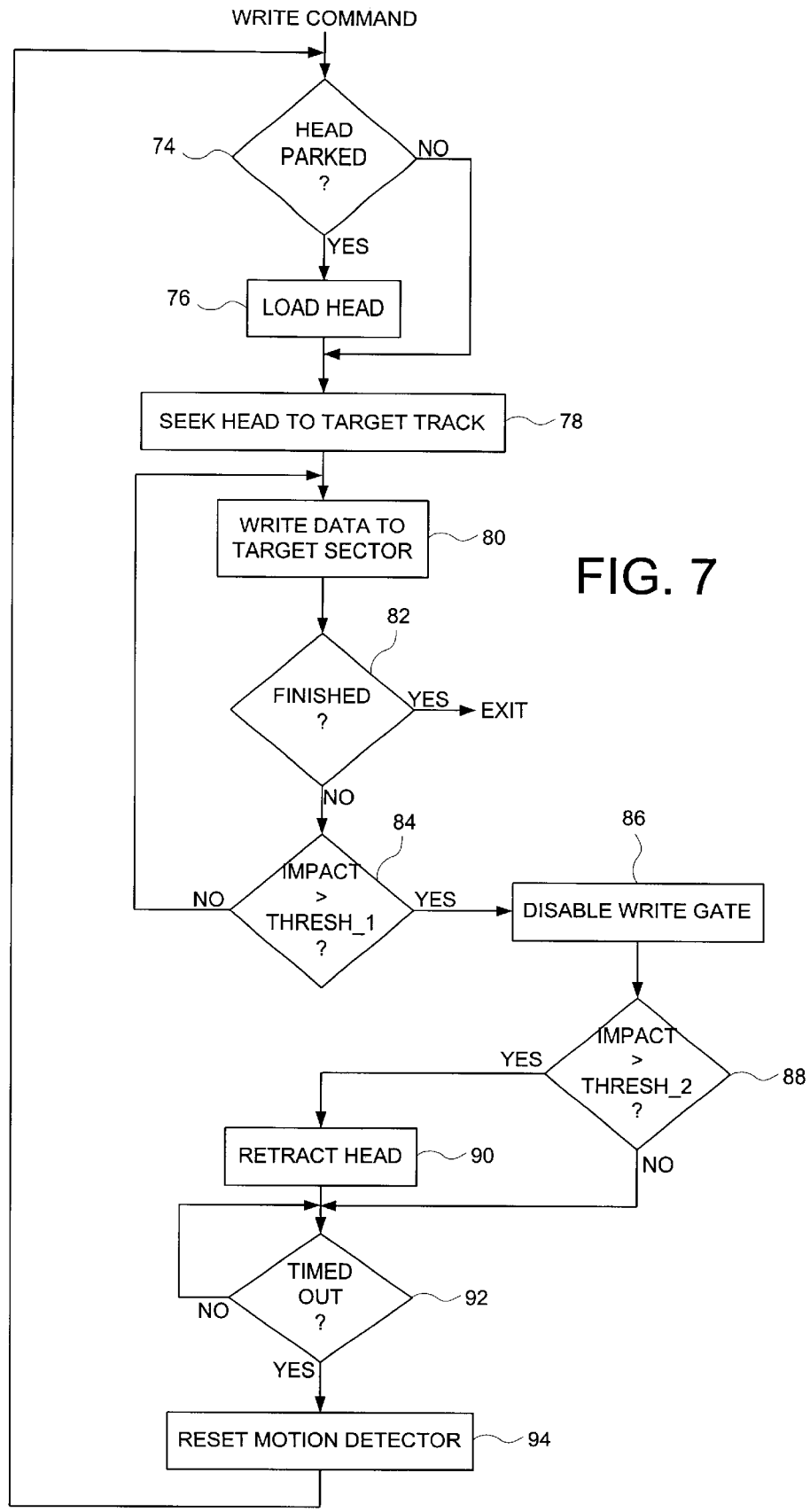
FIG. 7 is a flow chart according to an embodiment of the present invention illustrating a write operation wherein the write current is disabled and the head is retracted when the motion detector detects an impending impact with a foreign object.

FIG. 7 is a flow chart according to an embodiment of the present invention illustrating the steps executed when a shock expected condition is detected during a write operation. If at step 74 the head is parked, then at step 76 the head is loaded onto the disk. At step 78 a seek operation seeks the head to the target track, and at step 80 data is written to a target data sector. If all of the data is successfully written to the target data sector, then the write operation exits at step 82. In on embodiment, the head is parked at the end of the write operation.

If during the write operation at step 84 an impact is predicted having a force which exceeds a first predetermined threshold (i.e., operating within area 52, area 52', or area 54 of FIG. 5B), then at step 86 the write current is disabled. If at step 88 the force of the impact is predicted to exceed a second predetermined threshold (i.e., operating within area 54 of FIG. 5B), then at step 90 the head is retracted away from the data area of the disk. The write current is disabled and the head remains in the retracted position for a predetermined interval at step 92 after which time it is presumed that the threat of impact or the actual shock from the impact will have subsided. In one embodiment, the mobile device comprises shock detect circuitry for detecting when the actual shock has subsided at step 92. At step 94 the motion detector is reset, and the write operation is reattempted starting at step 74.

I claim:

1. A mobile device comprising:
   - a disk storage system comprising a disk and a head actuated over the disk, the disk comprising a data area;
   - a motion detector for detecting a relative velocity and distance of a foreign object with respect to the mobile-device; and
   - a retracting circuit for retracting the head away from the data area of the disk when the motion detector detects an impending impact with the foreign object.

2. The mobile device as recited in claim 1, wherein the motion detector comprises at least one transducer.

3. The mobile device as recited in claim 2, wherein the at least one transducer rotates to perform an omni-directional scan around the mobile device.

4. The mobile device as recited in claim 2, wherein the motion detector comprises a plurality of transducers.

5. The mobile device as recited in claim 4, wherein the plurality of transducers are arranged to form a substantially concentric scan from a predetermine point on the mobile device.

6. The mobile device as recited in claim 4, wherein each transducer is activated in a predetermined sequence to perform an omni-directional scan around the mobile device.

7. The mobile device as recited in claim 4, wherein the plurality of transducers are distributed at predetermined locations about the mobile device.

8. The mobile device as recited in claim 2, wherein the transducer comprises a sonar transducer.

9. The mobile device as recited in claim 8, wherein the sonar transducer operates in an ultrasonic range.

10. The mobile device as recited in claim 2, wherein the transducer comprises a radar transducer.

11. The mobile device as recited in claim 2, wherein the transducer comprises an optical transducer.

12. The mobile device as recited in claim 2, wherein the transducer comprises wireless communication circuitry for implementing a wireless communication function for the mobile device.

13. The mobile device as recited in claim 1, wherein:
   (a) the mobile device further comprises impact-detect circuitry for detecting an effect of the impact with the foreign object; and
   (b) operation of the motion detector is adapted in response to detecting the effect of the impact with the foreign object.

14. The mobile device as recited in claim 1, wherein:
   (a) a write current is applied to the head during a write operation; and
   (b) the motion detector disables the write current when an impending impact with the foreign object is detected.

15. A mobile device comprising:
   - a disk storage system comprising:
      - a disk;
      - a head actuated over the disk; and
      - a preamp for applying a write current to the head during a write operation; and
   - a motion detector for detecting a relative velocity and distance of a foreign object with respect to the mobile device, and for disabling the write current when an impending impact with the foreign object is detected.

16. The mobile device as recited in claim 15, wherein the motion detector comprises at least one transducer.

17. The mobile device as recited in claim 16, wherein the at least one transducer rotates to perform an omni-directional scan around the mobile device.

18. The mobile device as recited in claim 16, wherein the motion detector comprises a plurality of transducers.

19. The mobile device as recited in claim 18, wherein the plurality of transducers are arranged to form a substantially concentric scan from a predetermine point on the mobile device.

20. The mobile device as recited in claim 18, wherein each transducer is activated in a predetermined sequence to perform an omni-directional scan around the mobile device.

21. The mobile device as recited in claim 18, wherein the plurality of transducers are distributed at predetermined locations about the mobile device.

22. The mobile device as recited in claim 16, wherein the transducer comprises a sonar transducer.

23. The mobile device as recited in claim 22, wherein the sonar transducer operates in an ultrasonic range.

24. The mobile device as recited in claim 16, wherein the transducer comprises a radar transducer.

25. The mobile device as recited in claim 16, wherein the transducer comprises an optical transducer.

26. The mobile device as recited in claim 16, wherein the transducer comprises wireless communication circuitry for implementing a wireless communication function for the mobile device.

27. The mobile device as recited in claim 15, wherein:
   (a) the mobile device further comprises impact-detect circuitry for detecting an effect of the impact with the foreign object; and
   (b) operation of the motion detector is adapted in response to detecting the effect of the impact with the foreign object.

28. A method of operating a mobile device, the mobile device comprising a disk storage system comprising a disk and a head actuated over the disk, the disk comprising a data area, the method comprising the steps of:
   - detecting a relative velocity and distance of a foreign object with respect to the mobile device; and
   - retracting the head away from the data area of the disk when an impending impact with the foreign object is detected.

29. The method as recited in claim 28, wherein at least one transducer is used to detect the relative velocity and distance of the foreign object with respect to the mobile device.

30. The method as recited in claim 29, further comprising the step of rotating the transducer to perform an omni-directional scan around the mobile device.

31. The method as recited in claim 29, wherein a plurality of transducers are used to detect the relative velocity and distance of the foreign object with respect to the mobile device.

32. The method as recited in claim 31, wherein the plurality of transducers are arranged to form a substantially concentric scan from a predetermine point on the mobile device.

33. The method as recited in claim 31, further comprising the step of activating each transducer in a predetermined sequence to perform an omni-directional scan around the mobile device.

34. The method as recited in claim 31, wherein the plurality of transducers are distributed at predetermined locations about the mobile device.

35. The method as recited in claim 29, wherein the transducer comprises a sonar transducer.

36. The method as recited in claim 35, wherein the sonar transducer operates in an ultrasonic range.

37. The method as recited in claim 29, wherein the transducer comprises a radar transducer.

38. The method as recited in claim 29, wherein the transducer comprises an optical transducer.

39. The method as recited in claim 29, wherein the transducer comprises wireless communication circuitry for implementing a wireless communication function for the mobile device.

40. The method as recited in claim 28, further comprising the steps of:
   (a) detecting an effect of the impact with the foreign object; and
   (b) adapting the step of detecting a relative velocity and distance of a foreign object with respect to the mobile device in response to the detected effect of the impact with the foreign object.

41. The method as recited in claim 28, further comprising the steps of:
   (a) applying a write current to the head during a write operation; and
   (b) disabling the write current when an impending impact with the foreign object is detected.

42. A method of operating a mobile device, the mobile device comprising a disk storage system comprising a disk and a head actuated over the disk, wherein a write current is applied to the head during a write operation, the method comprising the steps of:
   detecting a relative velocity and distance of a foreign object with respect to the mobile device; and
   disabling the write current when an impending impact with the foreign object is detected.

43. The method as recited in claim 42, wherein the motion detector comprises at least one transducer.

44. The mobile device as recited in claim 43, further comprising the step of rotating the transducer to perform an omni-directional scan around the mobile device.

45. The method as recited in claim 43, wherein the motion detector comprises a plurality of transducers.

46. The method as recited in claim 45, wherein the plurality of transducers are arranged to form a substantially concentric scan from a predetermine point on the mobile device.

47. The method as recited in claim 45, further comprising the step of activating each transducer in a predetermined sequence to perform an omni-directional scan around the mobile device.

48. The method as recited in claim 45, wherein the plurality of transducers are distributed at predetermined locations about the mobile device.

49. The method as recited in claim 43, wherein the transducer comprises a sonar transducer.

50. The method as recited in claim 49, wherein the sonar transducer operates in an ultrasonic range.

51. The method as recited in claim 43, wherein the transducer comprises a radar transducer.

52. The method as recited in claim 43, wherein the transducer comprises an optical transducer.

53. The method as recited in claim 43, wherein the transducer comprises wireless communication circuitry for implementing a wireless communication function for the mobile device.

54. The method as recited in claim 42, further comprising the steps of:
   (a) detecting an effect of the impact with the foreign object; and
   (b) adapting the step of detecting a relative velocity and distance of a foreign object with respect to the mobile device in response to the detected effect of the impact with the foreign object.

* * * * *